United States Patent [19]

Litz

[11] 4,149,803
[45] Apr. 17, 1979

[54] COMPOSITE PETROGRAPHIC THIN SECTION SLIDE AND METHOD OF MAKING SAME

[76] Inventor: Per-Erik Litz, 317 Market St., New Richmond, Ohio 45157

[21] Appl. No.: 774,868

[22] Filed: Mar. 7, 1977

Related U.S. Application Data

[63] Continuation of Ser. No. 580,424, May 23, 1975, abandoned.

[51] Int. Cl.² ............................................. G02B 21/34
[52] U.S. Cl. ...................................... 356/244; 350/92; 356/36
[58] Field of Search ...................... 350/92, 95; 356/36, 356/244; 35/20

[56] References Cited

U.S. PATENT DOCUMENTS

| | | | |
|---|---|---|---|
| 3,572,892 | 3/1969 | Metzgar et al. | 356/244 X |
| 3,609,045 | 9/1971 | Stein | 356/244 X |
| 3,764,215 | 10/1973 | Wallach | 350/95 X |

OTHER PUBLICATIONS

Hussak, *The Determination of Rock–Forming Minerals*, J. Wiley & Sons, pp. 3–7, 1886.

Gage, *The Microscope*, Comstock Pub. Co., pp. 496–497, 1932.

Hoeg et al., "Liquid Identification and Level Indicating System", *IBM Tech. Diclo. Bull.* vol. 16, No. 5, p. 1620, Oct. 1973.

*Primary Examiner*—John K. Corbin
*Assistant Examiner*—Matthew W. Koren
*Attorney, Agent, or Firm*—Melville, Strasser, Foster & Hoffman

[57] ABSTRACT

A slide for use in microscopic studies is comprised of a plurality of coded samples arranged in rows and columns and sandwiched between two glass slides. The samples and the slides are bonded with a clear epoxy cement having an index of refraction equal to 1.54, the index of refraction of quartz.

The method of making the slides includes the steps of compacting grain samples in a vial, along with a color-coded epoxy resin, stacking and laminating wafers cut from a number of color-coded samples, cutting the stacked wafers to expose a face of each, bonding the exposed wafer faces to a slide, grinding the bonded wafer to obtain thin samples, covering the thin samples with glass bonded with clear cement.

9 Claims, 13 Drawing Figures

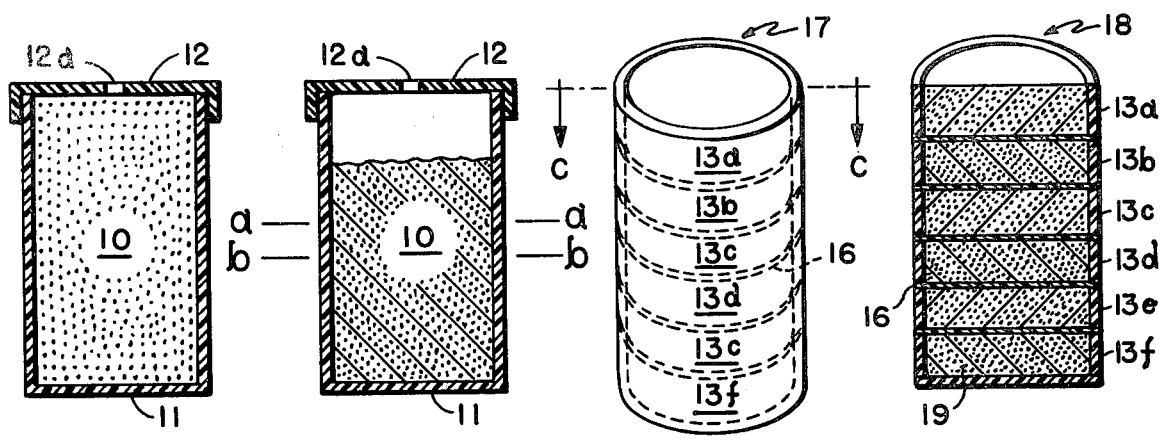
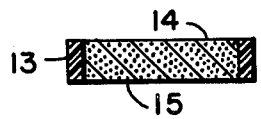
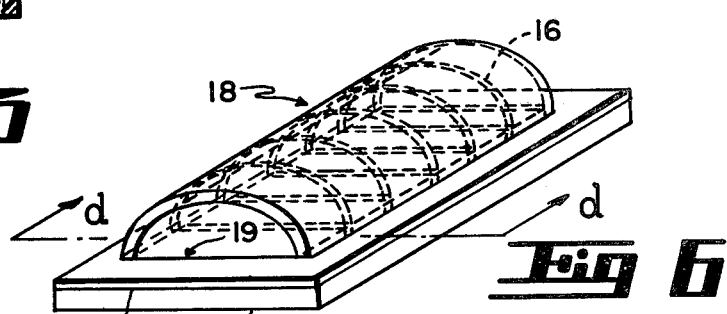
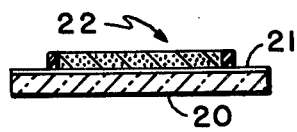
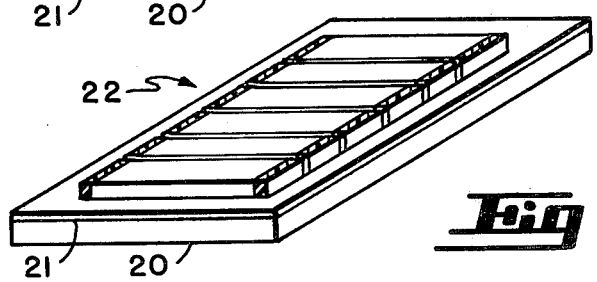
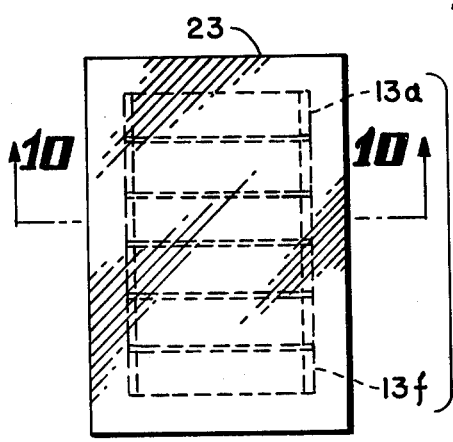
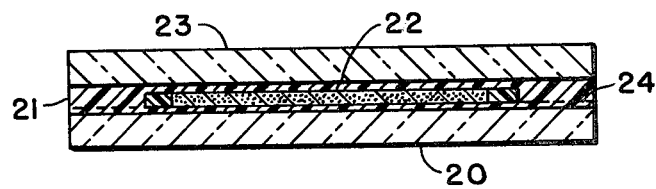

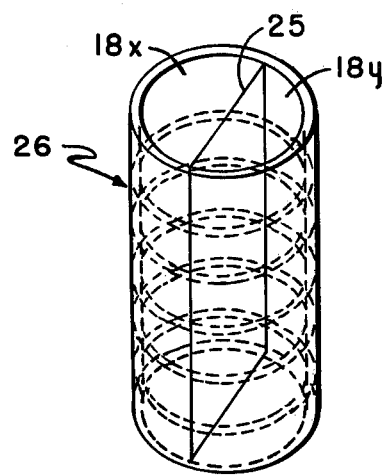
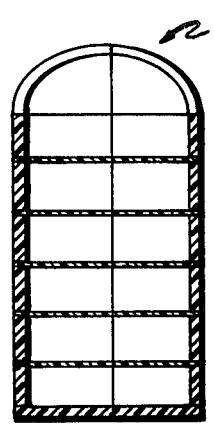
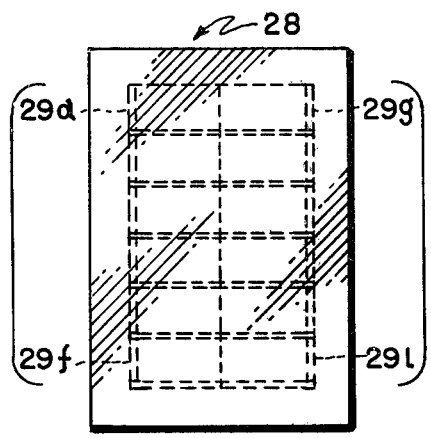

COMPOSITE PETROGRAPHIC THIN SECTION SLIDE AND METHOD OF MAKING SAME

This is a continuation of application Ser. No. 580,424, filed May 23, 1975 now abandoned.

BACKGROUND OF THE INVENTION

It is common practice in the oil and earth exploration industries to examine core samples of the land through which drilling is made. This is generally accomplished by mounting small quantities of the core samples on glass slides for inspection under a microscope.

At the present time a single sample is mounted on a slide, and each of the many steps required for mounting a properly prepared sample must be repeated for each sample. My invention enables me to simultaneously mount a plurality of samples on a single slide.

Broadly, stated, my inventive method provides for the combining of a plurality of color-coded core samples in orderly sequences, e.g., columns and rows, and for mounting the combined core samples on a single slide. My resultant structure is a combined grid of color-coded core samples cemented onto a glass slide.

For a more complete understanding of the details of my method and my improved slide, reference should now be made to the specification and to the accompanying drawings in which the various steps of the process and the resulting product is shown, as follows:

FIG. 1 shows loose core samples in a plastic cylindrical wall;

FIG. 2 shows the core samples compacted after centrifuging;

FIG. 3 shows a wafer sample cut from a vial of the configuration shown in FIG. 2;

FIG. 4 shows a plurality of stacked and laminated wafers, each of said wafers having been cut from different vials;

FIG. 5 shows the stacked laminated wafers as a half cylinder after lengthwise or axial cutting;

FIG. 6 shows the half cylinder of FIG. 5 bonded to a glass slide;

FIG. 7 shows the mounting of FIG. 6 after the cutting thereof to leave a slab having plane parallel surfaces;

FIG. 8 is a side elevation showing the slab ground to a very thin size;

FIG. 9 is a plan view of a completed slide of six samples;

FIG. 10 is a sectional taken through the line 10—10 of FIG. 9;

FIG. 11 shows an alternative step for liminating twelve samples onto a slide;

FIG. 12 shows another step in the twelve lamination process; and

FIG. 13 is a plan view of a twelve-sample slide.

In carrying out my inventive process, as applied to petrographic studies, a number of individual core samples or specimens 10 obtained from oil drilling operations are each placed in a transparent cylindrical plastic vial 11 having an open end which is closed with a cover 12, optionally provided with a port 12a to permit the passage of air from the vial. As shown in FIG. 1 and as received from the drilling operation, the specimens 10 are loose and may comprise sand, soils, pure crushed minerals, oils well cuttings, etc. Each of the specimens is then mixed or impregnated with a curable medium, such as a polyester resin or epoxy to which a distinctive dye preferably may have been added for color coding.

The impregnated sample 10 is then compacted within the vial 11, as may be seen in FIG. 2. Preferably, compacting is accomplished by centrifugal forces applied to the vial 11 in a centrifuge, the centrifugal forces being radially applied to the samples toward the closed end of the vial. It is also possible to impregnate by other means, for example, by vacuum, and to compact by pressure methods. But the centrifuge method is preferable in that samples of increased density are obtained, and at the same time essentially all air bubbles in the samples are expelled to provide a better specimen for examination. Furthermore, a centrifuge does not result in evaporation of the solvents in the resin or epoxy and this provides a better product life and faster curing times.

The impregnating medium is permitted to cure, hence imbedding the compacted samples within the vials. Normally, curing time is approximately five hours at room temperature. Neither the time of curing nor the temperature of the room is critical.

After curing, a small sample wafer 13 is cut from each one of the several vials. This is done by making two cuts at lines a—a and b—b spaced approximately ¼ inch apart through each vial and its contents in a plane perpendicular to the axis of the vial. The exposed faces 14 and 15 of the vials are then ground to insure parallelism.

After a wafer has been taken from each of a plurality of identical vials of samples, the wafers are then stacked and laminated, i.e., as seen in FIG. 4 the wafers 13 are cemented together into a cylindrical column by means of a cement or epoxy resin 16. As illustrated in FIG. 4, six wafers from six different core samples have been assembled. To distinguish between samples each wafer has been designated the reference character 13 followed by a letter suffix a–f. In the event that the various samples are not color-coded by the addition of a distinctive dye to the impregnating medium, it is important that a color additive or dye, such as powdered graphite, be added to the cement 16 so that there is a clear separation line established between the sample wafers 13a–13f.

After curing of the bond, I now have a laminated cylinder 17 composed of a plurality of wafers 13a–13f, each wafer representing a particular compacted specimen or sample, each cut from a different vial. The wafers are separated by a separation line resulting from the addition of a dye to the bonding material 16. In addition, or in the alternative, the wafers may have a distinctive color for coding purposes.

The next step in the process is the lengthwise cutting of the laminated cylinder 17, i.e., I cut the cylinder 17 in a plane parallel to the axis of the cylinder along the line c—c as shown in FIG. 4. As shown in FIG. 5, this cut results in a half cylinder 18 which exposes a planar face 19 having a plurality of rectangular planar surfaces now representing the wafer samples.

After cutting, the planar face 19 is ground. After grinding, the face 19 is bonded to a glass sheet 20, i.e., a clear glass with parallel faces. The bonding may be accomplished with any clear bonding medium 21 having an index of refraction equal to that of the index of refraction of quartz, i.e., approximately 1.5442. Epoxy cement, known by its trademark Hillquist Petrographic Epoxy, is suitable. Canada balsam may also be used.

After curing for approximately five hours at room temperature, the mounted half cylinder 19 of samples is again cut in a plane parallel to the bonded face along the line d—d in FIG. 6, leaving a slab 22 of samples 13a–f approximately 0.020 inch (see FIG. 7).

The slab 22 of samples is then ground, as seen in FIG. 8, to a thickness of 30 microns, making sure that all the faces of the glass and the slab are parallel. At 30 microns, materials with an index of refraction of 1.5442 become invisible so that the other materials in the specimen become more clearly discernable. The cement is chosen to have the proper index. The glass also has an index of 1.5442.

The mounted slab 22 of samples 13a-f may then be enclosed, as seen in FIG. 10, by a cover glass 23 bonded to the slab 22 by means of an epoxy or resin 24 having an index of refraction of approximately 1.5442. Thereafter, the slide is again cured. FIG. 9 shows the six samples 13a-13f in plan view.

With the disclosed method of making a slide I am able to mount a plurality of identifiable samples on a glass sheet, rather than only one sample, as is now common practice. I accomplish this result by laminating all of the samples in such a way that the cutting of the lamination results in a planar array. As illustrated in FIG. 10, I show an array consisting of one column of six. Obviously, the column may contain more samples, the number being limited only size of the slide, and the minimum size requirements for the particular study. I can, of course, have less than six samples.

I can double the number of specimens mounted on a slide by taking wafers from twelve vials and assembling two laminated cylinders or columns of six each following the steps shown in FIGS. 1 through 5. I then obtain a half cylinder 18x from one of the laminated cylinders and a complementary half cylinder 18y from the other. As seen in FIG. 11, the complementary half cylinders 18x and 18y are bonded together to form a single composite cylinder or column 26 by means of an epoxy resin 25. After curing, the cylinder 26 is cut lengthwise parallel to the composite cylinder axis to produce a twelve-sample half cylinder 27, as seen in FIG. 12. I then proceed with the steps beginning at FIG. 6 and produce a slide; however, as seen in FIG. 13, this slide has an array of six rows and two columns.

While a cylindrical vial has been illustrated, it is clear that a vial having any cross-sectional shape may be used, and therefore the term "axis" as applied to the vial is intended to apply to the center line of any vial, such center line being perpendicular to the cross section, irrespective of the shape of the cross section.

Furthermore, while I show only one and two column arrays, it is clear that arrays of any number of columns may be fabricated, particularly if a rectangular vial is used. Note that three columns may be produced from a cylindrical vial by constructing a cylinder of three 120° segments and making the lengthwise cut off-center and through all three segments. Laminated cylinders fabricated of eight segments can yield four columns by making an off-center cut through four of the segments. The only limits to the numbers of the samples are practical limits of minimum sample size, and maximum slide size.

In addition, while the specification has been directed specifically to slides for petrographic studies, the invention contemplates the making of slides useful for other purposes as well. Whereas petrographic studies generally require relatively transparent thin sections, ore microscopy uses thin sections which are opaque, and therefore only the cover sheet need be clear. Also, in some cases the cover sheet must be omitted, as is the case where the samples are gassified with an electron beam, e.g., with a microprobe.

While in the illustrated embodiment I show granular samples which are impregnated and compacted, this step can be omitted when solid samples are available, as is sometimes the case with rock and mineral samples.

While the disclosed petrographic specimens are very thin, i.e., 30 microns, thin sections are not necessary where the slides are not transparent.

The illustrated embodiment of the invention is readily adaptable to the placing of an identifying mark or marks on each of the slides. For this purpose I have found it advantageous to mark the frosted side, i.e., the ground side of the glass sheet with one or more identifying letters or numbers. I can do this just prior to cementing the face of the half cylinder to the ground side of the glass sheet.

Also, while I show the cementing of a half cylinder to the sheet, it will be readily apparent that less than half a cylinder may also be mounted; that is to say, cutting of the half cylinder may occur prior to bonding to the glass sheet or it may be cut after it is bonded, depending upon the tools which are available.

In summary, the essence of this invention is a slide on which a plurality of specimens can be mounted with little more effort than required for the mounting of a single specimen. The slide may be of the type which is useful in petrographic studies but it may also be used in the study of solid rocks or ores (or microscopy). In petrographic studies the slide is made transparent, i.e., the microscope looks through the slide. In the other studies the slide is reflective, i.e., the microscope looks at the images reflected from the slides. The slide may also be used with a microprobe, i.e., an electron beam. The essence of the method is making of a slide by the laminating of a number of specimens onto a planar sheet. This is done by fabricating a composite sample from a plurality of discrete samples. The composite is then cut to expose a surface comprising each of the samples. The exposed surface is then mounted on a slide.

I claim:

1. A composite petrographic thin section slide comprising:
    a transparent sheet having an index of refraction of approximately 1.5442, said transparent sheet having a substantially planar surface;
    a plurality of discrete thin petrographic samples of different origin, each said sample having at least one cut edge and adjacent edges being joined along said cut edges by a transparent bonding medium having an index of refraction of approximately 1.5442 to form a thin composite slab of samples bonded one to another and arranged in at least one row, said thin composite slab having plane parallel surfaces; and
    means for bonding one of said surfaces of said composite slab of samples to said planar surface of said sheet, said bonding means comprising a transparent bonding medium having an index of refraction of approximately 1.5442.

2. The invention as defined in claim 1 wherein said samples are arranged in a grid consisting of a plurality of rows and at least one column.

3. The invention as defined in claim 1 wherein said samples are arranged in a grid consisting of a plurality of rows and a plurality of columns.

4. The invention as defined in claim 1 wherein said bonding means is a cement.

5. The invention as defined in claim 1 including a cover for said slide, said cover comprising a second transparent sheet having an index of refraction of approximately 1.5442, said second transparent sheet having a planar surface bonded to the other surface of said composite slab of samples, and means bonding said cover sheet to the other surface of said slab, said bonding means comprising a transparent bonding medium having an index of refraction of approximately 1.5442.

6. The invention as defined in claim 1 wherein said samples comprise granular specimens impregnated with a curable medium.

7. The invention as defined in claim 6 wherein said medium contains a dye, each impregnated specimen containing a dye having a discrete color.

8. The invention as defined in claim 6 wherein said impregnated granular specimens are compacted.

9. The invention as defined in claim 1 wherein said transparent bonding medium for joining said adjacent samples along said cut edges is a cement containing a dye.

* * * * *